US007504461B2

(12) United States Patent
Cao

(10) Patent No.: US 7,504,461 B2
(45) Date of Patent: Mar. 17, 2009

(54) ION-CONDUCTIVE COPOLYMERS CONTAINING ONE OR MORE ION-CONDUCTING OLIGOMERS

(75) Inventor: Shuguang Cao, Mountain View, CA (US)

(73) Assignee: Polyfuel, Inc., Mountain View, CA (US)

( * ) Notice: Subject to any disclaimer, the term of this patent is extended or adjusted under 35 U.S.C. 154(b) by 135 days.

(21) Appl. No.: 11/077,994

(22) Filed: Mar. 11, 2005

(65) Prior Publication Data

US 2006/0041100 A1 Feb. 23, 2006

Related U.S. Application Data

(60) Provisional application No. 60/554,683, filed on Mar. 18, 2004, provisional application No. 60/552,917, filed on Mar. 12, 2004.

(51) Int. Cl.
*C08F 283/00* (2006.01)
*C08G 75/00* (2006.01)
*C08L 81/00* (2006.01)
*H01M 8/00* (2006.01)

(52) U.S. Cl. ................... 525/535; 525/538; 528/220; 528/373; 528/391; 528/480; 429/12

(58) Field of Classification Search ............... 525/535, 525/538; 528/373, 220, 391, 480; 429/12
See application file for complete search history.

(56) References Cited

U.S. PATENT DOCUMENTS

| | | | |
|---|---|---|---|
| 5,679,482 | A | 10/1997 | Ehrenberg et al. |
| 6,214,488 | B1 | 4/2001 | Helmer-Metzmann et al. |
| 6,451,921 | B2 | 9/2002 | Weisse et al. |
| 6,586,561 | B1 | 7/2003 | Litt et al. |
| 6,610,789 | B2 | 8/2003 | Watakabe et al. |
| 6,761,989 | B2 | 7/2004 | Terahara et al. |
| 6,765,027 | B2 | 7/2004 | Holdcroft et al. |
| 6,825,310 | B2 | 11/2004 | Goto et al. |
| 6,986,960 | B2 | 1/2006 | Oguri et al. |

FOREIGN PATENT DOCUMENTS

| | | |
|---|---|---|
| EP | 1 170 310 A2 | 1/2002 |
| EP | 1 449 886 A1 | 8/2004 |
| JP | 2003147074 A | 5/2003 |
| WO | WO 02/103834 A1 | 12/2002 |
| WO | WO 03/030289 A2 | 4/2003 |
| WO | WO 03/046080 A1 | 6/2003 |
| WO | WO 03/095509 | 11/2003 |
| WO | WO 2004/042839 | 5/2004 |

OTHER PUBLICATIONS

Ghassemi, H. et al, "New multiblock copolymers of sulfonated poly(4'-phenyl-2,5-benzophenone) and poly(arylene ether sulfone) for proton exchange membrane", Polymer Preprints, 44(1):814-815 (2003).*

Wiles, K. et al, "Disulfonated poly(arylene ether phenyl phosphine oxide sulfone) terpolymers fro PEM Fuel cell systems," Prepr. Pap.-Am, Chem. Soc., Div. Fuel Chem., 49(2):538-540 (2004).*
An, S-G, et al., "Morphology Control of Poly(Phenylene Oxide) by Ionomeric Poly(Styrenesulfonic Acid Sodium Salt) Copolymers for Fuel Cell Membrane," *Prepr. Pap.-Am.Chem. Soc., Div. Fuel Chem.*, 49(2):582-583 (2004).
Ding, J., et al., "A Self-organized Network of Nanochannels Enhances Ion Conductivity through Polymer Films," *American Chemical Society*, 13(7):2231-2233 (2001).
Ding, J., et al., "Solid Polymer Electrolytes Based on Ionic Graft Polymers: Effect of Graft Chain Length on Nano-Structured, Ionic Networks," *Ad. Funct. Mater.*, 12(5):389-394 (2002).
Ghassemi, H., et al., "New Multiblock Copolymers of Sulfonated Poly(4'-Phenyl-2,5-Benzophenone) and Poly(Arylene Ether Sulfone) for Proton Exchange Membrane," *Polymer Preprints*, 44(1):814-815 (2003).
Jung, D., et al., "A performance evaluation of direct methanol fuel cell using impregnated tetraethyl-orthosilicate in cross-linked polymer membrane," *International Journal of Hydrogen Energy*, 26:1263-1269 (2001).
Kim, J., et al., "Proton conductivities and methanol permeabilities of membranes made from partially sulfonated polystyrene-block-poly-(ethylene-ran-butylene)-block-polystyrene copolymers," *Journal of Membrane Science*, 207:129-137 (2002).
Mecham, "Direct Polymerization of Sulfonated Poly (Arylene Ether) Random Copolymers and Poly(Imide) Sulfonated Poly (Arylene Ether) Segmented Copolymers: New Candidates for Proton Exchange Membrane Fuel Cell Material Systems," *Dissertation submitted to the faculty of the Virginia Polytechnic Institute and State University*, (2001).
Savadogo, O., "Emerging membranes for electrochemical systems Part II. High temperature composite membranes for polymer electrolyte fuel cell (PEFC) applications," *Journal of Power Sources*, 127:135-161 (2004).
Scanlon & Beniciwicz, "Polybenzimidazole Based Segmented Block Copolymers for High Temperature Fuel Cell Membranes," *Prepr. Pap.-Am. Chem. Soc., Div. Fuel Chem.*, 49(2):522 (2004).
Wang, H., et al., "Synthesis of Substituted Poly(P-Phenylene)s by Nickel (0) Catalyzed Coupling Reaction and Derived Multiblock Copolymers for Proton Exchange Membrane Fuel Cells," *Prepr. Pap.-Am. Chem. Soc., Div. Fuel Chem.*, 49(2):586-587 (2004).
Wiles, K., et al., "Disulfonated Poly(Arylene Ether Phenyl Phosphine Oxide Sulfone) Terpolymers for PEM Fuel Cell Systems," *Prepr. Pap.-Am. Chem. Soc., Div. Fuel Chem.*, 49(2):538-540 (2004).
Won, J., et al., "Fixation of Nanosized Proton Transport Channels in Membranes," *Macromolecules*, 36:3228-3234 (2003).
Xing, et al., "Direct copolymerization of Sulfonated Poly(aryl ether ketone)s containing naphthalene or hexafluoroisopropylidene diphenyl moieties for Novel Proton Exchange Membranes," *Proceedings—Hydrogen and Fuel Cells*, pp. 93-102 (2003).

* cited by examiner

*Primary Examiner*—Duc Truong
(74) *Attorney, Agent, or Firm*—Morgan Lewis & Bockius LLP

(57) ABSTRACT

The invention provides ion-conductive copolymers that can be used to fabricate proton exchange membranes (PEM's), catalyst coated proton exchange membranes (CCM's) and membrane electrode assemblies (MEA's) which are useful in fuel cells and their application in electronic devices, power sources and vehicles. The ion-conductive copolymers comprise one or more ion-conductive oligomers randomly positioned in a polymeric backbone that is not ion-conductive.

12 Claims, No Drawings

ION-CONDUCTIVE COPOLYMERS CONTAINING ONE OR MORE ION-CONDUCTING OLIGOMERS

TECHNICAL FIELD

This invention relates to ion-conductive polymers that are useful in forming polymer electrolyte membranes used in fuel cells.

BACKGROUND OF THE INVENTION

Fuel cells are promising power sources for portable electronic devices, electric vehicles, and other applications due mainly to their non-polluting nature. Of various fuel cell systems, polymer electrolyte membrane based fuel cells such as direct methanol fuel cells (DMFCs) and hydrogen fuel cells, have attracted significant interest because of their high power density and energy conversion efficiency. The "heart" of a polymer electrolyte membrane based fuel cell is the so called "membrane-electrode assembly" (MEA), which comprises a proton exchange membrane (PEM), catalyst disposed on the opposite surfaces of the PEM to form a catalyst coated membrane (CCM) and a pair of electrodes (i.e., an anode and a cathode) disposed to be in electrical contact with the catalyst layer.

Proton-conducting membranes for DMFCs are known, such as Nafion® from the E.I. Dupont De Nemours and Company or analogous products from Dow Chemical. These perfluorinated hydrocarbon sulfonate ionomer products, however, have serious limitations when used in high temperature fuel cell applications. Nafion® loses conductivity when the operation temperature of the fuel cell is over 80° C. Moreover, Nafion® has a very high methanol crossover rate, which impedes its applications in DMFCs.

U.S. Pat. No. 5,773,480, assigned to Ballard Power System, describes a partially fluorinated proton conducting membrane from α, β, β-trifluorostyrene. One disadvantage of this membrane is its high cost of manufacturing due to the complex synthetic processes for monomer α, β, β-trifluorostyrene and the poor sulfonation ability of poly (α, β, β-trifluorostyrene). Another disadvantage of this membrane is that it is very brittle, thus has to be incorporated into a supporting matrix.

U.S. Pat. Nos. 6,300,381 and 6,194,474 to Kerrres, et al. describe an acid-base binary polymer blend system for proton conducting membranes, wherein the sulfonated poly(ether sulfone) was made by post-sulfonation of the poly(ether sulfone).

M. Ueda in the Journal of Polymer Science, 31(1993): 853, discloses the use of sulfonated monomers to prepare the sulfonated poly(ether sulfone polymers).

U.S. patent application US 2002/0091225A1 to McGrath, et al. used this method to prepare sulfonated polysulfone polymers.

The need for a good membrane for fuel cell operations requires balancing various properties of the membrane. Such properties included proton conductivity, fuel-resistance, chemical stability and fuel crossover, especially for high temperature applications, fast start up of DMFCs, and durability. In addition, it is important for the membrane to retain its dimensional stability over the fuel operational temperature range. If the membrane swells significantly, it will increase fuel crossover, resulting in degradation of cell performance. Dimensional changes of the membrane also put stress on the bonding of the catalyst membrane-electrode assembly (MEA). Often this results in delamination of the membrane from the catalyst and/or electrode after excessive swelling of the membrane. Therefore, it is necessary to maintain the dimensional stability of the membrane over a wide temperature range to minimize membrane swelling.

SUMMARY OF THE INVENTION

The invention provides ion-conductive copolymers that can be used to fabricate proton exchange membranes (PEM's), catalyst coated proton exchange membranes (CCM's) and membrane electrode assemblies (MEA's) which are useful in fuel cells and their application in electronic devices, power sources and vehicles.

In one aspect, the ion-conductive copolymers comprise one or more ion-conductive oligomers (sometimes referred to as ion-conductive segments or ion-conductive blocks) distributed in a polymeric backbone that is substantially not ion-conductive. The non-ion-conductive portions of the copolymer are generally hydrophobic and/or non-ionic monomers that extend from the ends of the ion-conductive oligomer and in some embodiments link two or more ion-conductive oligomers together.

In a preferred embodiment, the ion-conducting oligomer comprises a first comonomer and a second comonomer. The first comonomer comprises one or more ion-conducting groups. At least one of the first or second comonomers comprises two leaving groups while the other comonomer comprises two displacement groups. In one embodiment, one of the first or second comonomers is in molar excess as compared to the other so that the oligomer formed by the reaction of the first and second comonomers contains either leaving groups or displacement groups at each end of the ion-conductive oligomer. This intermediate ion-conducting oligomer is combined with third and fourth comonomers where one of the third and fourth comonomers comprises two leaving groups and the other comonomer comprises two displacement groups. In some embodiments, one of the third or fourth comonomers may be the same as the second comonomer used in the oligomerization step. Comonomers do not contain ion-conducting groups. In some cases, the other of the third and fourth comonomers is the same as the first comonomer but without the ion-conducting group(s). Polymerization of the intermediate ion-conducting oligomer with the third and fourth comonomers results in a polymer where the ion-conducting oligomer is distributed within the copolymer so formed.

The use of ion-conducting oligomers in the copolymer improves the efficiency of ion conductivity within the copolymer. This is because the ion-conducting groups of the ion-conducting oligomer tend to aggregate together when the copolymer is solidified. As a consequence, less energy is lost during proton migration through the solid copolymer.

It is also possible to balance water up-take maximize conductivity and in-situ performance and minimize RH sensitivity for H2/Air fuel cells by varying the content and/or relative amount of the ion-conducting oligomer in the copolymer.

The foregoing membranes find particular utility in hydrogen fuel cells although they may be used with other fuels such as direct methanol fuel cells. Such fuel cells can be used in electronic devices, both portable and fixed, power supplies including auxiliary power units (APU's) and as locomotive power for vehicles such as automobiles, aircraft and marine vessels and APU's associated therewith.

DETAILED DESCRIPTION OF THE INVENTION

In one aspect, the invention provides simplified methods for making ion-conductive copolymers comprising an ion-conductive oligomer contained within a polymer backbone. Uses of such ion-conductive polymeric materials include the formation of polymer electrolyte membranes (PEMs), catalyst coated membranes (CCM's) and membrane electrolyte assemblies (MEA's) used in fuel cells and the like.

General methods for the preparation of ion-conducting copolymers are as follows. The methods include the steps of combining a first comonomer comprising an ion-conducting group with a second comonomer to form a first ion-conducting oligomer. At least one of the first and second comonomers have at least two leaving groups and the other comonomer has at least two displacing groups. In one embodiment, one of the first or second comonomers is in molar excess relative to the other comonomer, thereby forming an ion-conductive oligomer with leaving groups or displacing groups on the end of the intermediate ion-conductive oligomer. This oligomer is preferably polymerized with third and fourth comonomers each having two leaving groups or two displacement groups to form the ion-conductive copolymer. In a preferred embodiment, third and fourth monomers are added to the same reaction vessel in which the intermediate ion-conductive oligomer is made.

The term "leaving group" is intended to include those functional moieties that can be displaced by a nucleophilic moiety found, typically, in another monomer. Leaving groups are well recognized in the art and include, for example, halides (chloride, fluoride, iodide, bromide), tosyl, mesyl, etc. In certain embodiments, the monomer has at least two leaving groups. In the preferred polyphenylene embodiments, the leaving groups may be "para" to each other with respect to the aromatic monomer to which they are attached. However, the leaving groups may also be ortho or meta.

The term "displacing group" is intended to include those functional moieties that can act typically as nucleophiles, thereby displacing a leaving group from a suitable monomer. The monomer with the displacing group is attached, generally covalently, to the monomer that contained the leaving group. In a preferred polyarylene example, fluoride groups from aromatic monomers are displaced by phenoxide, alkoxide or sulfide ions associated with an aromatic monomer. In polyphenylene embodiments, the displacement groups are preferably para to each other. However, the displacing groups may be ortho or meta as well.

An example of the synthesis of a polyarylene ion-conducting oligomer is as follows where LG is a leaving group, DG a displacement group, $Ar_1$ is an aryl group containing an ion-conducting group, $Ar_3$ is an aryl group, X is —C(O)— or —S(O$_2$)—, Y is formed upon condensation of LG and DG and n is the number of ion-conductive repeating units.

The ion-conducting oligomer is made by combining comonomers to form the ion-conductive oligomers shown:

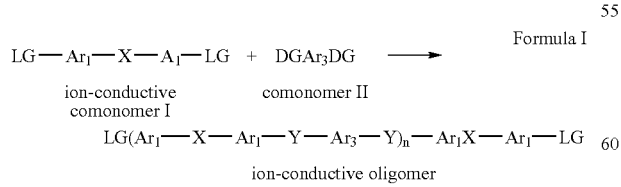

when comonomer I is in excess; and

when comonomer II is in excess.

Alternatively, the ion-conductive comonomer I can contain displacement groups while comonomer II contains leaving groups. In either case, the ion-conductive oligomer will have leaving or displacement groups at each end or leaving and displacement groups at opposite ends that can react with one or more comonomers to form a copolymer containing one or more ion-conducting oligomers.

In a preferred embodiment, the third and fourth comonomers are reacted with the ion-conductive oligomer of reactions (1) or (2). This results in an ion-conductive copolymer of Formula IV and V:

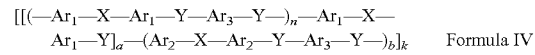  Formula IV

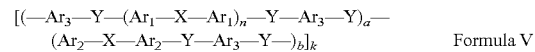  Formula V

In a preferred embodiment, $Ar_1$ and $Ar_2$ are independently phenyl, substituted phenyl napthyl, terphenyl, aryl nitrile, substituted aryl nitrile, and $Ar_1$ further $Ar_3$ is the same or different from each other and are selected from the group.

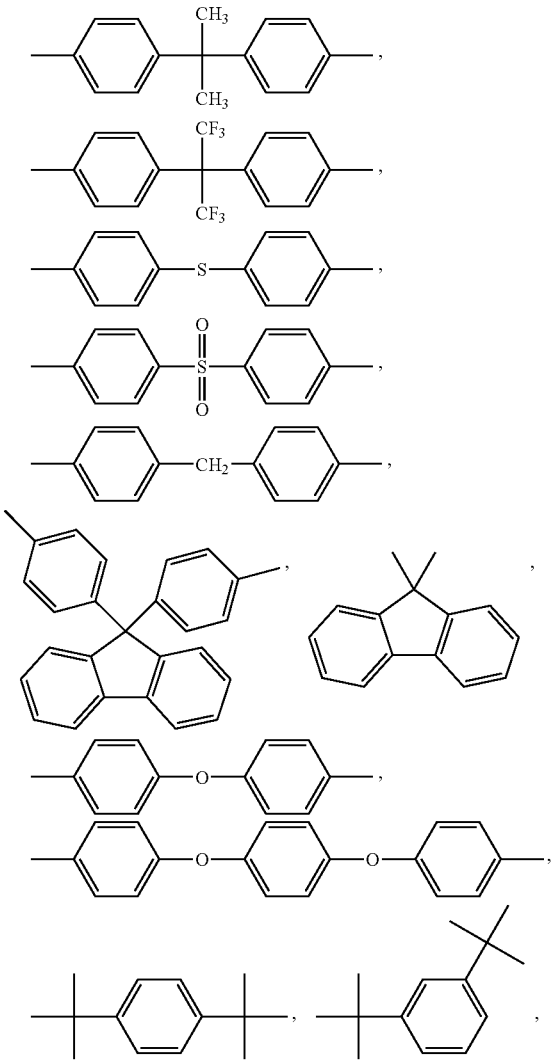

-continued

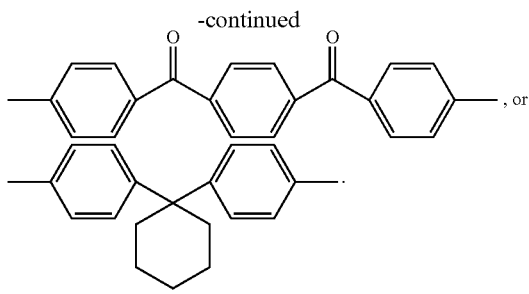, or wherein the ion-conductive groups comprise —$SO_3^-$, —$COO^-$, —$PO_3H^-$ or sulfonimide; m and o are independently 0 or 1; wherein n is between 2 and 12, and k is between 1 and 150. In a preferred embodiment, n is between 2 and 8; a and b are mole fractions where a+b=1; a is between 0.01 and 0.5 and b is between 0.5 and 0.99.

The ion-conductive oligomer may also be represented by Formula VI:

   Formula VI where Ar' is an aryl group containing an ion-conducting group, T is independently a bond, O, S, C(O), S($O_2$), alkyl, branched alkyl, fluoroalkyl, branched fluoroalkyl, cyclic alkyl, aryl, substituted aryl or heterocyclic; and U is independently O or S and n is the number of (Ar'-T) units.

When the ion-conducting oligomer of Formula VII is incorporated into a polymer, the ion-conducting copolymers can be represented by Formula VI:

   Formula VII where Ar" is aryl, V is independently a bond O, S, C(O), S($O_2$), alkyl, branched alkyl, fluoroalkyl, branched fluoroalkyl, cyclic alkyl, aryl, substituted aryl or heterocycle and W is independently O or S, a and b are mole fractions where a+b=1, a is between 0.01 and 0.5 and b is between 0.5 and 0.99. In Formula V and Formula VI, n is preferably 2-12, more preferably 2-10, and more preferably 2-8, and most preferably 3-6. In a particularly preferred embodiment, n=4.

Composition containing the ion-conducting polymers comprise a population mixture of copolymers where the ion-conducting oligomer(s) are randomly distributed within each of the copolymers. In the case of a single ion-conducting oligomer, a population is produced where the ion-conducting oligomer will have tails at each end that are not ion conducting where the length of the tails will vary among the copolymers of the population. In the case of a multiplicity of ion-conducting oligomers, the population of copolymers will contain ion-conducting oligomers wherein the spacing between ion-conducting oligomers will vary within a single copolymer as well as among the population of copolymers. When multiple ion-conducting oligomers are used, it is preferred that the copolymer contain on average between 2 and 35 ion-conducting oligomers, more preferably between 5 and 35, still more preferably between 10 and 35, and most preferably between 20 and 35 ion-conducting oligomers.

Comonomers used to make a variety of different ion-conducting copolymers and not otherwise identified herein can also be used. Such comonomers include those disclosed in U.S. patent application Ser. No. 09/872,770, filed Jun. 1, 2001, Publication No. US 2002-0127454 A1, published Sep. 12, 2002, entitled "Polymer Composition"; U.S. patent application Ser. No. 10/351,257, filed Jan. 23, 2003, Publication No. US 2003-0219640 A1, published Nov. 27, 2003, entitled "Acid Base Proton Conducting Polymer Blend Membrane"; U.S. patent application Ser. No. 10/438,186, filed May 13, 2003, Publication No. US 2004-0039148 A1, published Feb. 26, 2004, entitled "Sulfonated Copolymer"; U.S. application Ser. No. 10/449,299, filed Feb. 20, 2003, Publication No. US 2003-0208038 A1, published Nov. 6, 2003, entitled "Ion-conductive Copolymer"; and 60/520,266, filed Nov. 13, 2003, entitled "Ion-conductive Copolymers Containing First and Second Hydrophobic Oligomers," each of which are expressly incorporated herein by reference. Other comonomers include those used to make sulfonated trifluorostyrenes (U.S. Pat. No. 5,773,480), acid-base polymers, (U.S. Pat. No. 6,300,381), poly arylene ether sulfones (U.S. patent Publication No. US2002/0091225A1); graft polystyrene (*Macromolecules* 35:1348 (2002)); polyimides (U.S. Pat. No. 6,586, 561 and *J. Membr. Sci.* 160:127 (1999)) and Japanese Patent Applications Nos. JP2003147076 and JP2003055457, each of which are expressly identified herein by reference.

The mole percent of ion-conducting groups when only one ion-conducting group is present in comonomer I is preferably between 30 and 70%, or more preferably between 40 and 60%, and most preferably between 45 and 55%. When more than one conducting group is contained within the ion-conducting monomer, such percentages are multiplied by the total number of ion-conducting groups per monomer. Thus, in the case of a monomer comprising two sulfonic acid groups, the preferred sulfonation is 60 to 140%, more preferably 80 to 120%, and most preferably 90 to 110%. Alternatively, the amount of ion-conducting group can be measured by the ion exchange capacity (IEC). By way of comparison, Nafion® typically has a ion exchange capacity of 0.9 meq per gram. In the present invention, it is preferred that the IEC be between 0.9 and 3.0 meq per gram, more preferably between 1.0 and 2.5 meq per gram, and most preferably between 1.6 and 2.2 meq per gram.

An example of the fabrication of an ion-conducting polymer is as follows:

Formula VIII

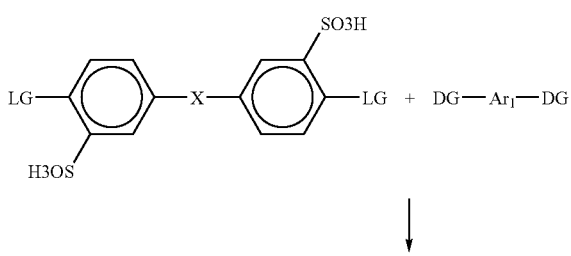

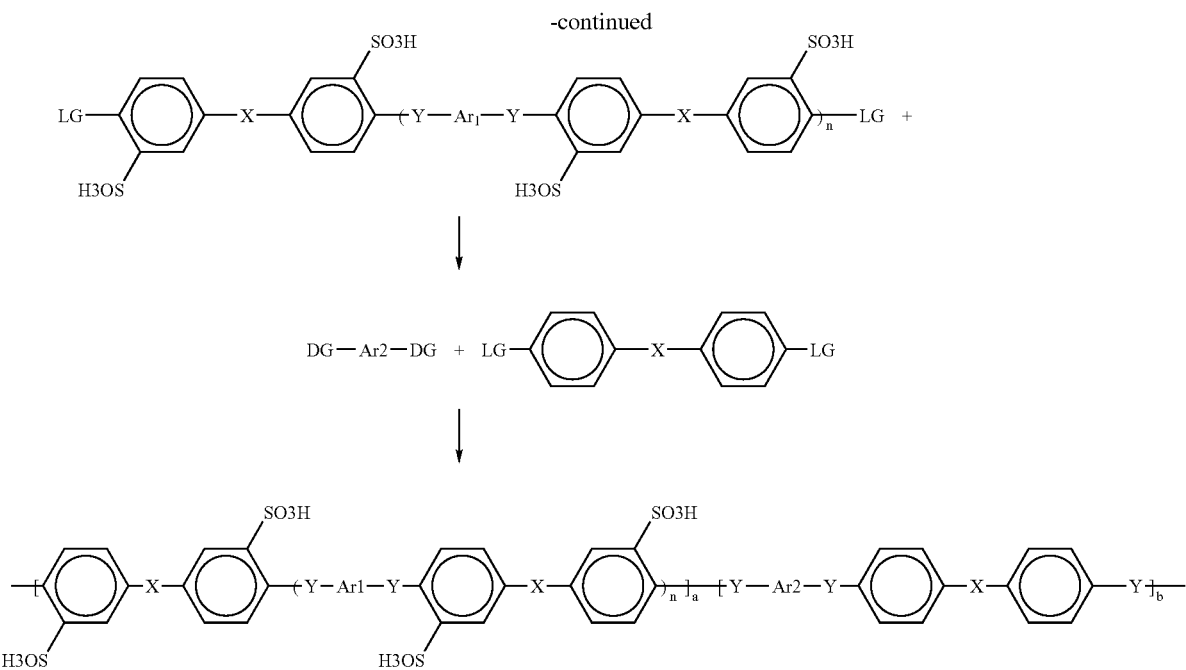

When Y is O or S and $Ar_1$ and $Ar_2$ can be the same or different and are selected from the group consisting of:

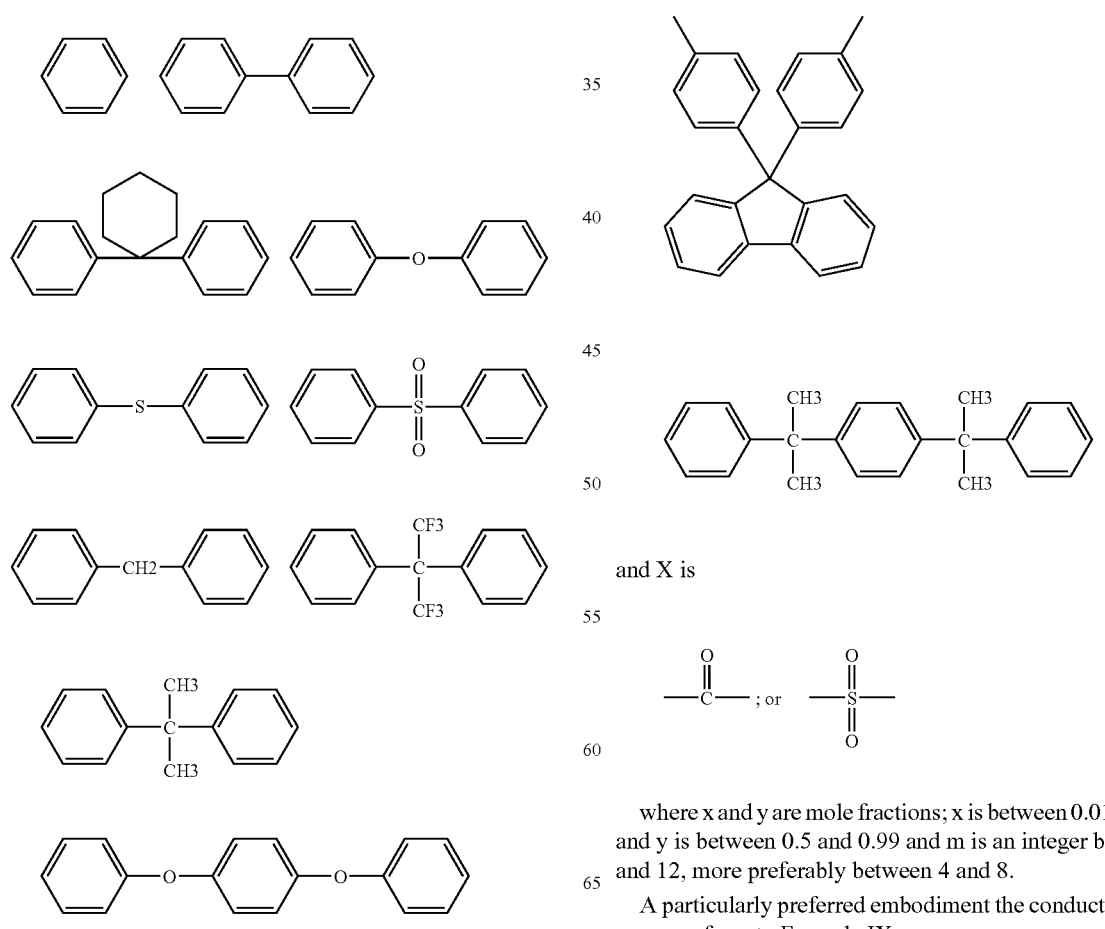

and X is

[structures showing carbonyl and sulfonyl groups]; or where x and y are mole fractions; x is between 0.01 and 0.5, and y is between 0.5 and 0.99 and m is an integer between 2 and 12, more preferably between 4 and 8.

A particularly preferred embodiment the conducting polymers conform to Formula IX:

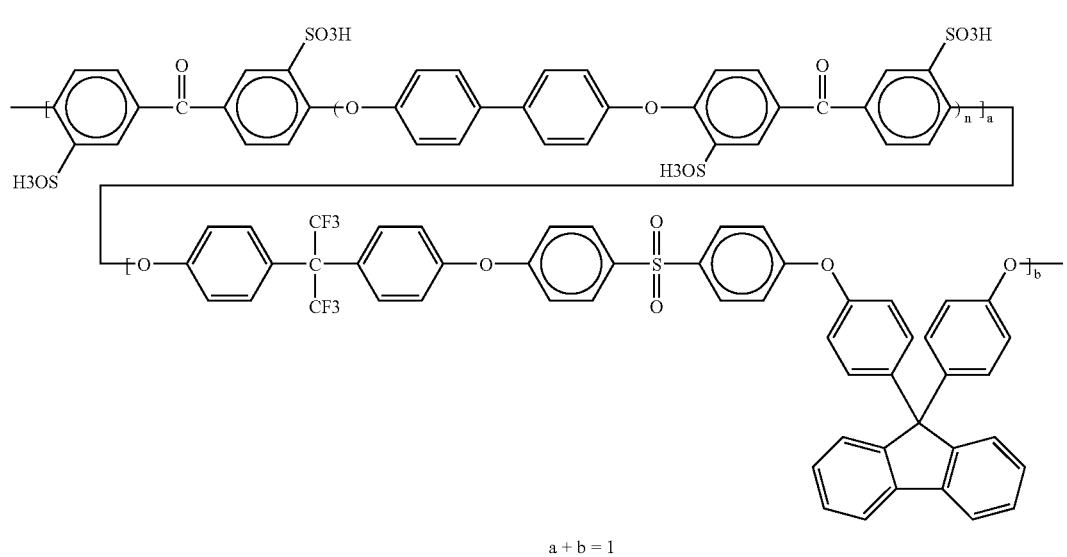

Formula IX a + b = 1 where a and b are mole fractions; a is between 0.01 and 0.5, b is between 0.5 and 0.99 and n is an integer between 2 and 12, more preferably between 4 and 8.

Although the copolymers of the invention have been described in connection with the use of arylene polymers, the principle of using an ion-conductive oligomer can be applied to many other systems. For example, the ionic oligomers need not be arylene but rather may be aliphatic or perfluorinated aliphatic backbones containing ion-conducting groups. Ion-conducting groups may be attached to the backbone or may be pendant to the backbone, e.g., attached to the polymer backbone via a linker. Alternatively, ion-conducting groups can be formed as part of the standard backbone of the polymer. See, e.g., U.S. 2002/018737781, published Dec. 12, 2002. Any of these ion-conducting oligomers can be used to practice the present invention.

Polymer membranes may be fabricated by solution casting of the ion-conductive copolymer. Alternatively, the polymer membrane may be fabricated by solution casting the ion-conducting polymer the blend of the acid and basic polymer.

When cast into a membrane for use in a fuel cell, it is preferred that the membrane thickness be between 0.1 to 10 mils, more preferably between 1 and 6 mils, most preferably between 1.5 and 2.5 mils, and it can be coated over polymer substrate.

As used herein, a membrane is permeable to protons if the proton flux is greater than approximately 0.005 S/cm, more preferably greater than 0.01 S/cm, most preferably greater than 0.02 S/cm.

As used herein, a membrane is substantially impermeable to methanol if the methanol transport across a membrane having a given thickness is less than the transfer of methanol across a Nafion membrane of the same thickness. In preferred embodiments the permeability of methanol is preferably 50% less than that of a Nafion membrane, more preferably 75% less and most preferably greater than 80% less as compared to the Nafion membrane.

After the ion-conducting copolymer has been formed into a membrane, it may be used to produce a catalyst coated membrane (CCM). As used herein, a CCM comprises a PEM when at least one side and preferably both of the opposing sides of the PEM are partially or completely coated with catalyst. The catalyst is preferable a layer made of catalyst and ionomer. Preferred catalysts are Pt and Pt—Ru. Preferred ionomers include Nafion and other ion-conductive polymers. In general, anode and cathode catalysts are applied onto the membrane by well established standard techniques. For direct methanol fuel cells, platinum/ruthenium catalyst is typically used on the anode side while platinum catalyst is applied on the cathode side. For hydrogen/air or hydrogen/oxygen fuel cells platinum or platinum/ruthenium is generally applied on the anode side, and platinum is applied on the cathode side. Catalysts may be optionally supported on carbon. The catalyst is initially dispersed in a small amount of water (about 100 mg of catalyst in 1 g of water). To this dispersion a 5% ionomer solution in water/alcohol is added (0.25-0.75 g). The resulting dispersion may be directly painted onto the polymer membrane. Alternatively, isopropanol (1-3 g) is added and the dispersion is directly sprayed onto the membrane. The catalyst may also be applied onto the membrane by decal transfer, as described in the open literature (*Electrochimica Acta*, 40: 297 (1995)).

The CCM is used to make MEA's. As used herein, an MEA refers to an ion-conducting polymer membrane made from a CCM according to the invention in combination with anode and cathode electrodes positioned to be in electrical contact with the catalyst layer of the CCM.

The electrodes are in electrical contact with the catalyst layer, either directly or indirectly, when they are capable of completing an electrical circuit which includes the CCM and a load to which the fuel cell current is supplied. More particularly, a first catalyst is electrocatalytically associated with the anode side of the PEM so as to facilitate the oxidation of hydrogen or organic fuel. Such oxidation generally results in the formation of protons, electrons and, in the case of organic fuels, carbon dioxide and water. Since the membrane is substantially impermeable to molecular hydrogen and organic fuels such as methanol, as well as carbon dioxide, such components remain on the anodic side of the membrane. Electrons formed from the electrocatalytic reaction are transmitted from the cathode to the load and then to the anode. Balancing this direct electron current is the transfer of an equivalent number of protons across the membrane to the anodic compartment. There an electrocatalytic reduction of oxygen in the presence of the transmitted protons occurs to form water. In one embodiment, air is the source of oxygen. In another embodiment, oxygen-enriched air is used.

The membrane electrode assembly is generally used to divide a fuel cell into anodic and cathodic compartments. In such fuel cell systems, a fuel such as hydrogen gas or an organic fuel such as methanol is added to the anodic compartment while an oxidant such as oxygen or ambient air is allowed to enter the cathodic compartment. Depending upon the particular use of a fuel cell, a number of cells can be combined to achieve appropriate voltage and power output. Such applications include electrical power sources for residential, industrial, commercial power systems and for use in locomotive power such as in automobiles. Other uses to which the invention finds particular use includes the use of fuel cells in portable electronic devices such as cell phones and other telecommunication devices, video and audio consumer electronics equipment, computer laptops, computer notebooks, personal digital assistants and other computing devices, GPS devices and the like. In addition, the fuel cells may be stacked to increase voltage and current capacity for use in high power applications such as industrial and residential sewer services or used to provide locomotion to vehicles. Such fuel cell structures include those disclosed in U.S. Pat. Nos. 6,416,895, 6,413,664, 6,106,964, 5,840,438, 5,773,160, 5,750,281, 5,547,776, 5,527,363, 5,521,018, 5,514,487, 5,482,680, 5,432,021, 5,382,478, 5,300,370, 5,252,410 and 5,230,966.

Such CCM and MEM's are generally useful in fuel cells such as those disclosed in U.S. Pat. Nos. 5,945,231, 5,773, 162, 5,992,008, 5,723,229, 6,057,051, 5,976,725, 5,789,093, 4,612,261, 4,407,905, 4,629,664, 4,562,123, 4,789,917, 4,446,210, 4,390,603, 6,110,613, 6,020,083, 5,480,735, 4,851,377, 4,420,544, 5,759,712, 5,807,412, 5,670,266, 5,916,699, 5,693,434, 5,688,613, 5,688,614, each of which is expressly incorporated herein by reference.

The CCM's and MEA's of the invention may also be used in hydrogen fuel cells which are known in the art. Examples include U.S Pat. Nos. 6,630,259; 6,617,066; 6,602,920; 6,602,627; 6,568,633; 6,544,679; 6,536,551; 6,506,510; 6,497,974; 6,321,145; 6,195,999; 5,984,235; 5,759,712; 5,509,942; and 5,458,989 each of which are expressly incorporated herein by reference.

The ion-conducting polymer membranes of the invention also find use as separators in batteries. Particularly preferred batteries are lithium ion batteries.

EXAMPLES

Example 1

In a 250 ml three necked round flask, equipped with a mechanical stirrer, thermometer, nitrogen inlet and Dean-Stark trap/condenser, 3,3'-disulfonated-4,4'-difluorobenzophone (8.444 g), biphenol (2.7931 g), and anhydrous potassium carbonate (2.7 g) were dissolved in a mixture of DMSO and Toluene (about 20% solid concentration). The mixture was heated to toluene flux with stirring, keeping the temperature at 140° C. for 6 h, then increase temperature to 173-175° C. for 4 h. The reaction mixture was cooled down to 50° C. and then 4,4'-difluoropheyl sulfone 5.8477 g, Bis AF 8.472 g, Dihydoxyl fluorene 0.9811 g, anhydrous potassium carbonate 5.1 g together with DMSO and toluene were introduced to the previous reaction mixture to form the second 20% reaction solution. The mixture was heated to toluene flux with stirring, keeping the temperature at 140° C. for 6 h, then the temperature was increased to 173-175° C. for 4 h. After cooling with continuing stirring, the solution was dropped into 500 ml of methanol. The precipitates were filtrated and washed with DI-water four times and dried at 80° C. overnight, and then dried at 80° C. under vacuum for 2 days.

The polymer is treated in 0.5 mol $H_2SO_4$ aqueous solution at 80° C. for 1 hour to produce the proton form of sulfonic acid group in the polymer and washed with deionized water and dried at 80° C. overnight, and then dried at 80° C. under vacuum for 2 days.

Dried polymer is dissolved in dimethylacetamide (DMAc) to make a solution (25 wt %) and cast, and dried at 80° C. to make a membrane (2.0 mil thick). The obtained membrane is treated in 1.5 mol $H_2SO_4$ aqueous solution to get rid of DMAc residue and rinsed in DI-water until no $H_2SO_4$ residue was detected, and dried at 80° C.

The polymer membrane is swollen in water at room temperature and the polymer membrane conductivity is measured by AC impedance. The dried membrane is swollen in boiling water for 1 hour to measure water-uptake and swelling by area.

Example 2

In a 250 ml three necked round flask, equipped with a mechanical stirrer, thermometer, nitrogen inlet and Dean-Stark trap/condenser, 3,3'-disulfonated-4,4'-difluorobenzophone (8.444 g), 1,1-bis(4-hydroxyphenyl)cyclohexane (BisZ) (4.0254 g) and anhydrous potassium carbonate (2.7 g) were dissolved in a mixture of DMSO and Toluene (about 20% solid concentration). The mixture was heated to toluene flux with stirring, keeping the temperature at 140° C. for 6 h, then increase temperature to 173-175° C. for 4 h. The reaction mixture was cool down to 50 C and then 4,4'-difluorophenyl ketone 5.0186 g, Bis AF 9.3845 g, anhydrous potassium carbonate 5.1 g together with DMSO and toluene were introduced to the previous reaction mixture to form the second 20% reaction solution. The mixture was heated to toluene flux with stirring, keeping the temperature at 140° C. for 6 h, then increase temperature to 173-175° C. for 4 h. After cooling down with continuing stirring, the solution was dropped into 500 ml of methanol. The precipitates were filtrated and washed with DI-water four times and dried at 80° C. overnight, and then dried at 80° C. under vacuum for 2 days.

Example 3

In a 250 ml three necked round flask, equipped with a mechanical stirrer, thermometer, nitrogen inlet and Dean-Stark trap/condenser, 3,3'-disulfonated-4,4'-difluorobenzophone (8.444 g), 9,9-bis(4-hydroxyphenyl)fluorene (5.2562 g), and anhydrous potassium carbonate (2.7 g) were dissolved in a mixture of DMSO and Toluene (about 20% solid concentration). The mixture was heated to toluene flux with stirring, keeping the temperature at 140° C. for 6 h, then increase temperature to 173-175° C. for 4 h. The reaction mixture was cool down to 50 C and then 4,4'-difluorophenyl ketone 5.0186 g, Bis AF 9.3845 g, anhydrous potassium carbonate 5.1 g together with DMSO and toluene were introduced to the previous reaction mixture to form the second 20% reaction solution. The mixture was heated to toluene flux with stirring, keeping the temperature at 140° C. for 6 h, then increase temperature to 173-175° C. for 4 h. After cooling down with continuing stirring, the solution was dropped into 500 ml of methanol. The precipitates were filtrated and washed with DI-water four times and dried at 80° C. overnight, and then dried at 80° C. under vacuum for 2 days. A membrane is formed as described in Example 1.

Example 4

In a 250 ml three necked round flask, equipped with a mechanical stirrer, thermometer, nitrogen inlet and Dean-Stark trap/condenser, 3,3'-disulfonated-4,4'-difluorobenzophone (8.444 g), biphenol (2.9794 g), and anhydrous potassium carbonate (2.7 g) were dissolved in a mixture of DMSO and Toluene (about 20% solid concentration). The mixture was heated to toluene flux with stirring, keeping the temperature at 140° C. for 6 h, then increase temperature to 173-175° C. for 4 h. The reaction mixture was cool down to 50 C and then 4,4'-difluropheyl sulfone 5.8477 g, Bis AF 8.1703 g, Dihydoxyl fluorene 0.9461 g, anhydrous potassium carbonate 5.1 g together with DMSO and toluene were introduced to the previous reaction mixture to form the second 20% reaction solution. The mixture was heated to toluene flux with stirring, keeping the temperature at 140° C. for 6 h, then increase temperature to 173-175° C. for 4 h. After cooling down with continuing stirring, the solution was dropped into 500 ml of methanol. The precipitates were filtrated and washed with DI-water four times and dried at 80° C. overnight, and then dried at 80° C. under vacuum for 2 days.

Example 5

In a 250 ml three necked round flask, equipped with a mechanical stirrer, thermometer, nitrogen inlet and Dean-Stark trap/condenser, 3,3'-disulfonated-4,4'-difluorobenzophone (8.444 g), biphenol (2.7931 g), and anhydrous potassium carbonate (2.7 g) were dissolved in a mixture of DMSO and Toluene (about 20% solid concentration). The mixture was heated to toluene flux with stirring, keeping the temperature at 140° C. for 6 h, then increase temperature to 173-175° C. for 4 h. The reaction mixture was cool down to 50 C and then 4,4'-difluropheyl sulfone 5.8477 g, Bis AF 7.0608 g, 9,9-bis(4-hydroxyphenyl)fluorene 0.9811 g, and 2,2'-disulfonated-4,4'-dihydroxyl biphenyl 1.6388 g anhydrous potassium carbonate 5.1 g together with DMSO and toluene were introduced to the previous reaction mixture to form the second 20% reaction solution. The mixture was heated to toluene flux with stirring, keeping the temperature at 140° C. for 6 h, then increase temperature to 173-175° C. for 4 h. After cooling down with continuing stirring, the solution was dropped into 500 ml of methanol. The precipitates were filtrated and washed with DI-water four times and dried at 80° C. overnight, and then dried at 80° C. under vacuum for 2 days.

TABLE I

| | | Monomers Used | |
|---|---|---|---|
| Acronym | Full name | Molecular weight | Chemical structure |
| 1) Difluoro-end monomers | | | |
| Bis K | 4,4'-Difluorobenzophenone | 218.20 | 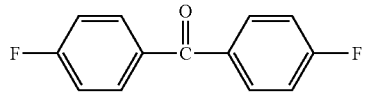 |
| Bis SO$_2$ | 4,4'-Difluorodiphenylsulfone | 254.25 | 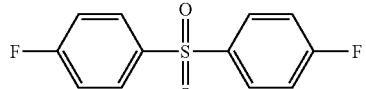 |
| S-Bis K | 3,3'-disulfonated-4,4'-difluorobenzophone | 422.28 | 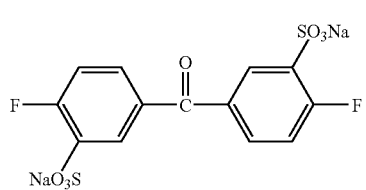 |
| 2) Dihydroxy-end monomers | | | |
| Bis AF (AF or 6F) | 2,2-Bis(4-hydroxyphenyl) hexafluoropropane or 4,4'-(hexafluoroisopropylidene) diphenol | 336.24 | 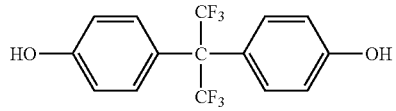 |
| BP | Biphenol | 186.21 | 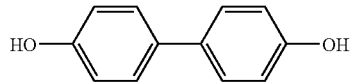 |

TABLE I-continued

| | | | |
|---|---|---|---|
| Bis FL | 9,9-Bis(4-hydroxyphenyl)fluorene | 350.41 | |
| Bis Z | 4,4'-cyclohexylidenebisphenol | 268.36 | |
| Bis S | 4,4'-thiodiphenol | 218.27 | |
| 3) Dithiol-end monomers | | | |
| | 4,4'-thiolbisbenzenethiol | | |

What is claimed is:

1. An ion-conductive copolymer having the formula $$[[(-Ar_1-X-Ar_1-Y-Ar_3-Y-)_n-Ar_1-X-Ar_1-Y-]_a-(Ar_2-X-Ar_2-Y-Ar_3-Y-)_b]_k$$

or the formula $$[(-Ar_3-Y-(Ar_1-X-Ar_1)_n-Y-Ar_3-Y)_a-(Ar_2-X-Ar_2-Y-Ar_3-Y-)_b]_k$$

where $Ar_1$ and $Ar_2$ are independently phenyl, substituted phenyl napthyl, terphenyl, aryl nitrile, substituted aryl nitrile, and $Ar_1$ further comprises an ion-conducting group, X is independently —C(O)— or —S(O)$_2$, Y is independently —O— or —S—, $Ar_3$ is the same or different from each other and are selected from the group

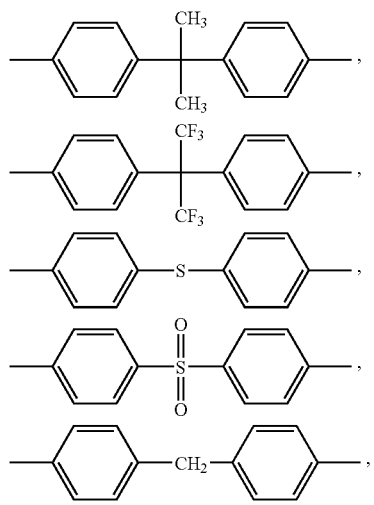

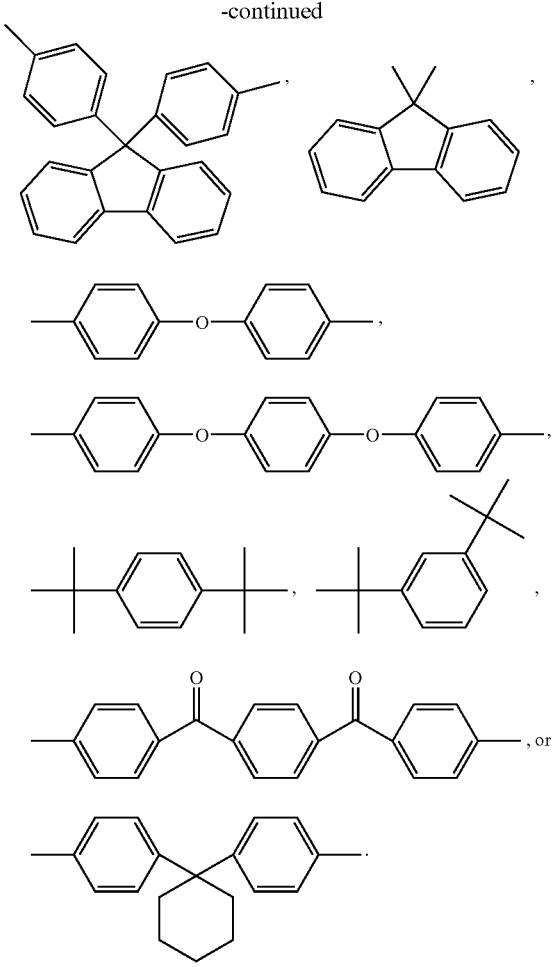

wherein the ion-conductive groups comprise —SO$_3^-$, —COO$^-$, —PO$_3$H$^-$ or sulfonimide; n is between 2 and 12, a and b are mole fractions where a+b=1, a is between 0.01 and 0.5 and b is between 0.5 and 0.99 and k is between 1 and 150.

2. A population of the ion-conductive copolymers of claim 1.

3. A polymer exchange membrane (PEM) comprising the ion-conducting copolymer of claim 1.

4. A catalyst coated membrane (CCM) comprising the PEM of claim 3 wherein all or part of at least one opposing surface of said PEM comprises a catalyst layer.

5. A catalyst coated membrane (CCM) comprising the PEM of claim 4 wherein all or part of at least one opposing surface of said PEM comprises a catalyst layer.

6. A membrane electrode assembly (MEA) comprising the CCM of claim 5.

7. A fuel cell comprising the MEA of claim 6.

8. The fuel cell of claim 7 comprises a hydrogen fuel cell.

9. An electronic device comprising the fuel cell of claim 7.

10. A power supply comprising the fuel cell of claim 7.

11. An electric motor comprising the fuel cell of claim 7.

12. A vehicle comprising the electric motor of claim 11.

* * * * *